June 22, 1948.  E. A. STALKER  2,443,936
HELICOPTER WITH JET DRIVEN LIFT ROTOR
EMPLOYING BOUNDARY LAYER AIR
Filed Nov. 8, 1943  2 Sheets-Sheet 1

INVENTOR
Edward A. Stalker
By Marechal and Biebel
ATTORNEYS

June 22, 1948.  E. A. STALKER  2,443,936
HELICOPTER WITH JET DRIVEN LIFT ROTOR
EMPLOYING BOUNDARY LAYER AIR
Filed Nov. 8, 1943  2 Sheets-Sheet 2

INVENTOR
Edward A. Stalker
By Marechal and Biebel
ATTORNEYS

Patented June 22, 1948

2,443,936

UNITED STATES PATENT OFFICE 2,443,936

HELICOPTER WITH JET-DRIVEN LIFT ROTOR EMPLOYING BOUNDARY LAYER AIR

Edward A. Stalker, Bay City, Mich.

Application November 8, 1943, Serial No. 509,397

2 Claims. (Cl. 244—17)

My invention relates to aircraft and more particularly to aircraft provided with lifting rotors.

It has for its principal object to provide an aircraft in which a high efficiency jet reaction force is developed for use in the operation of the rotating wings of the aircraft.

It is a further object to provide a system of jet propulsion for the operation of a helicopter which affords high efficiency with a jet of such size as to be highly practicable.

It is a further object to provide a jet propulsion system for aircraft having lifting rotors in which an available source of air of low energy relative to the plane is utilized in the production of a high efficiency jet producing a practicable and efficient overall propulsion system for rotating the rotor.

Other objects and advantages will be apparent from the following description, the accompanying drawings and the appended claims.

For the consideration of the propulsion of an aircraft by a jet the following notation will be found useful. Let—

$V$=Flight velocity (assumed the same for all cases to be considered).
$V_a$=velocity of approach of the air relative to the propulsive device.
$\rho$=mass density of air.
$A_j$=cross sectional area at the jet discharge opening.
$V_j$=jet velocity at the discharge opening.

Then in the general case the mass of air flowing in the jet is $$m = \rho A_j V_j \qquad (1)$$

In this same case the propulsive device, such as a jet engine, propeller and the like, takes air at the velocity $V_a$ and changes its velocity by the amount $w$ to an exit velocity of $V_j$. Since thrust is equal to the change in velocity imparted to a mass per unit of time, then $$T = m(V_j - V_a) \qquad (2)$$

Also in the general case it can be shown that the efficiency is $$E = \frac{2V}{V_j + V_a} \qquad (3)$$

This efficiency is for the jet only and does not include any compressor or duct losses.

For the commonly treated case the velocity of approach to the device is the same as the speed of flight, as for instance, in the case of the propeller. That is, $V_a = V$. Using the symbols of the general case but with subscript 1—

$$m_1 = \rho A_{i_1} V_{i_1} \qquad (4)$$

$$T_1 = m_1(V_{i_1} - V) = \rho A_{i_1} V_{i_1}(V_{i_1} - V) \qquad (5)$$

$$E_1 = \frac{2V}{V_{i_1} + V} \qquad (6)$$

If the propulsive device can be supplied with air which has a very low velocity in comparison to the speed of flight the efficiency of propulsion will be increased as can be seen from the limiting case where $V_a = 0$. In this instance, using the same symbols but with the subscript 2—

$$m_2 = \rho A_{i_2} V_{i_2} \qquad (7)$$

$$T_2 = m_2 V_{i_2} = \rho A_{i_2} V_{i_2}^2 \qquad (8)$$

$$E_2 = \frac{2V}{V_{i_2}} \qquad (9)$$

The great reduction in cross-sectional area of the jet using air received at $V_a = 0$ for equal thrusts may be seen by equating the thrusts of (5) and (8). Thus—

$$A_{i_1} V_{i_1}(V_{i_1} - V) = A_{i_2} V_{i_2}^2 \qquad (10)$$

leading to $$\frac{A_{i_2}}{A_{i_1}} = \frac{V_{i_1}(V_{i_1} - V)}{V_{i_2}^2} \qquad (11)$$

If the jets are also to have the same jet efficiencies equate Equations 6 and 9 and solve for $V_{i_2}$ $$V_{i_2} = V_{i_1} + V \qquad (12)$$

Now substitute for $V_{i_2}$ in (11) giving $$\frac{A_{i_2}}{A_{i_1}} = \frac{V_{i_1}(V_{i_1} - V)}{(V_{i_1} + V)^2} \qquad (13)$$

If now for instance $V_{i_1} = 1.2V$ $$\frac{A_{i_2}}{A_{i_1}} = \frac{1.2(1.2 - 1)}{(1.2 + 1)^2} \cong 0.05 \qquad (14)$$

Hence if the jet be formed from air which originally had substantially reduced or no velocity or pressure energy relative to the plane the jet cross-section can be about 5% of the cross-section where the jet is formed from air having the relative velocity of the speed of flight, and adequate thrust at high overall efficiency is obtained.

The air which forms the boundary layer on the fuselage is an available source of air of very low energy relative to the aircraft. Immediately adjacent the surface of the body the boundary layer has zero velocity so the average velocity for the whole layer is approximately one-half the velocity of flight. If the inner half of the layer is used the average velocity is approximately one-quarter of the speed of flight, a velocity less than the speed of flight representing a gain, the slower the initial velocity the greater being the gain.

It is to be understood that it is not advantageous to slow the air down by simply stopping it to provide air for the jet. When air is slowed down the static pressure increases but as soon as the pressure is allowed to drop the velocity reappears. Thus it is clear that the air should have not only zero initial velocity but zero initial pressure energy. Stopping the air gives a rearward drag on the body which thus offsets any increase in the efficiency of the jet itself.

In my U. S. Patent No. 2,041,796, a helicopter rotor is shown which can be rotated by a jet of large mass emitted from slots in the blade surfaces. In this patent the air to be ejected from the slots is inducted through a relatively wide fuselage slot and such that the air so utilized has initially substantially the rearward relative velocity of the speed of flight, and hence has high energy relative to the aircraft, requiring the handling of a larger mass of air by the blower than in the case where the air has no initial relative velocity. If the air has already lost its initial energy relative to the aircraft due to some useful or unavoidable cause, then this air can be used to advantage for the jet. Since the presence of a low energy film or envelope of air forming a boundary layer on the surfaces bathed by the atmosphere in which the aircraft must operate is an inherent accompaniment of the passage of the aircraft through the air, it comprises an available and advantageous source of decelerated or deenergized air.

I accomplish the objects of the invention by the means illustrated in the accompanying drawings in which—

Figure 1:
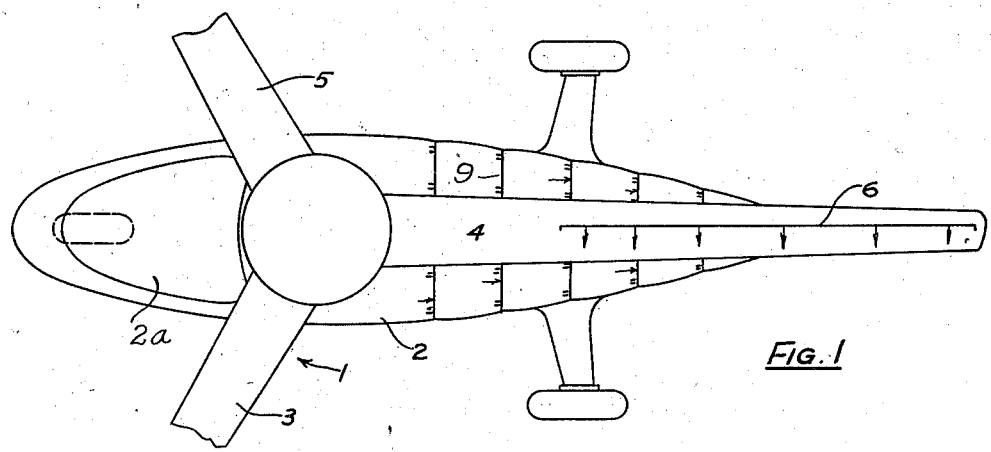
Fig. 1 is a top plan view of an aircraft constructed in accordance with the present invention.
Figure 2:
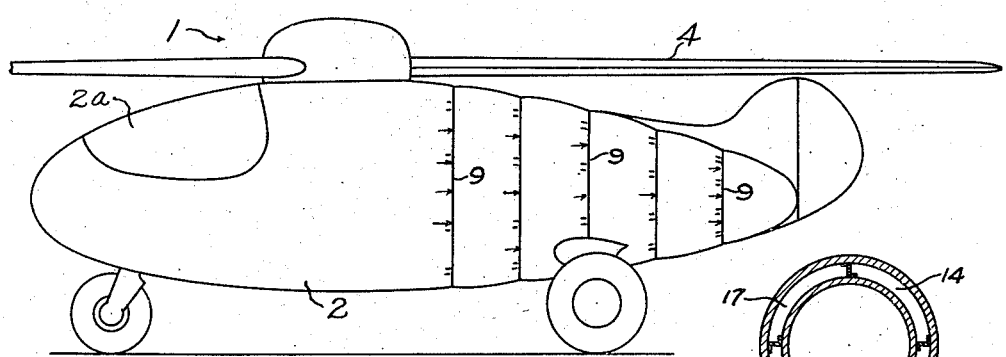
Fig. 2 is a side elevation of the aircraft.
Figure 4:
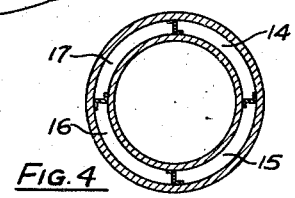
Fig. 4 is a vertical section through the fuselage on line 4—4 of Fig. 3.

Referring particularly to the drawings the rotor is 1 and the fuselage is 2. The blades of the rotor are 3, 4 and 5. Each blade has a discharge slot 6 leading out of the blade interior and extending over a substantial part of the length of the blade.

Air is supplied to the blades by the multi-stage blower 7 driven by the engine 8. The blower inducts the boundary layer through the slots 9 in the sides of the fuselage. The slots are located in the rear half of the fuselage and distributed in the direction of flight. While the forward half of the fuselage may be formed with slots also, the slots preferably begin just aft of the cross-section of maximum width or maximum area. By placing the first slot well aft on the fuselage the boundary layer is allowed to thicken so that the inner portion of it can be readily inducted to furnish a quantity of air of very low energy.

Figure 9:
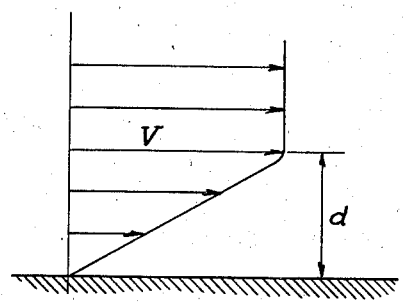
Figs. 9 and 10 are diagrammatic views representing the velocity relationship in the boundary layer.
Figure 10:
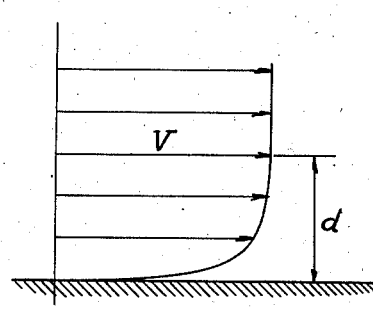

Furthermore a laminar flow can be maintained on the surface which is the type of flow which will furnish the maximum amount of decelerated air close to the body surface. Fig. 9 shows a laminar flow along a surface while Fig. 10 shows a turbulent flow. It is to be noted that the laminar layer of thickness $d$ has a much lower velocity close to the surface of the body or wall, and hence it is desired to so form the slots and the walls of the fuselage as to facilitate the formation and induction of a laminar boundary layer. The spacing of the slots along the fuselage surface is preferably such that a laminar flow is maintained up to the first slot and between the succeeding slots.

Figure 3:
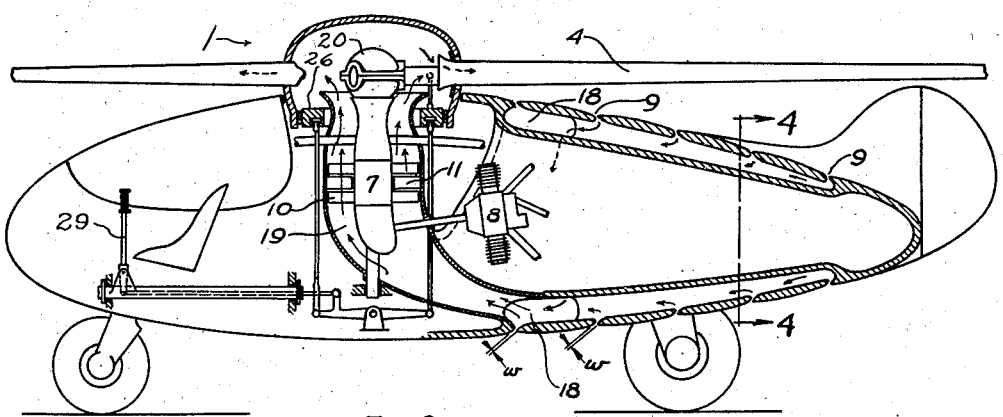
Fig. 3 is a side elevation partly in section.
Figure 5:
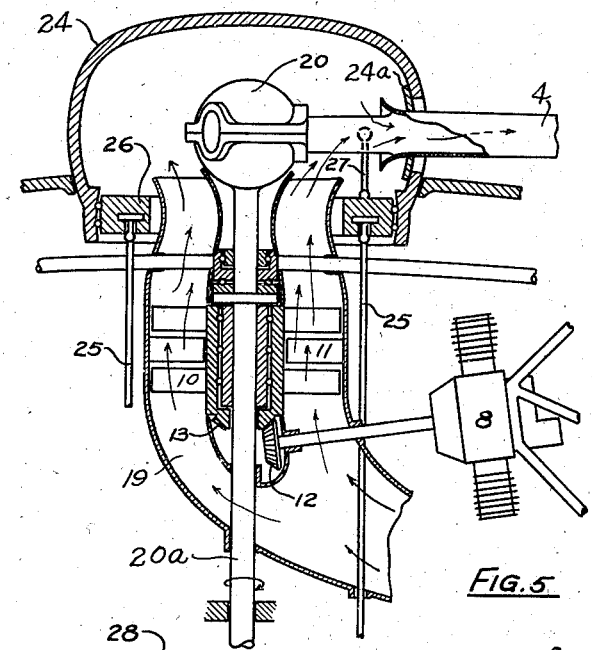
Fig. 5 is a fragmentary enlarged section of the rotor through the axis of rotation.
Figure 6:
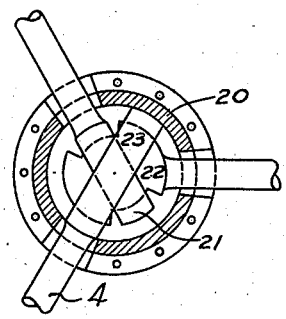
Fig. 6 is a fragmentary section through the rotor hub transverse to the axis of rotation.

In order to induct the boundary layer or the inner part of it without mixing in air of higher velocity, the slots should be narrow in width. Thus in Fig. 3 the width $w$ is desirably less than about one and one-half per cent, of the length of the surface ahead of the slot and aft of the preceding slot if there is one. The length of this surface determines the boundary layer thickness to which the slot width should bear a definite relation. The longitudinal arching of the surfaces between slots also facilitates the preservation of the boundary layer.

In order to preserve a laminar layer over as great a surface as possible of the fuselage the usual windshield construction is abandoned and the forward part of the fuselage is given an ellipsoidal form with transparent walls over a substantial portion of the upper and forward part of the fuselage. By providing as great a volume as possible within the laminar boundary layer it is possible to remove a smaller inner portion of the layer where the average velocity is low relative to the aircraft and yet provides sufficient air to form the jet.

The blower is composed of rotors 10 alternating with one or more stators 11. The former are driven from the engine 8 by the gears 12 and 13. The stator is supported in a fixed air flow duct 19.

Boundary layer air entering the slots 9 flows forward within the annular passages 14 to 17 formed between spaced outer and inner walls of the fuselage, to the circumferential passage 18 from which duct 19 leads to the blower. These passages expand in cross-section toward the forward part of the fuselage to accommodate the increasing flow from the slots and to avoid internal resistance to the flow.

The hub may be constructed as described in Patent 2,041,796 referred to above. Briefly the blades are socketed within the hub 20 to permit a change in pitch and flapping, the hub shaft 20a being mounted in the aircraft for rotation independently of rotor 10.

The hub housing 24 receives the propelling air and directs it into the bell-mouthed inner end of the blade, the housing being closed by sealing means 24a at the openings through which the blades extend, to prevent loss of air pressure.

The air flows through the blades and into and outwardly through the slots 6.

Figure 8:
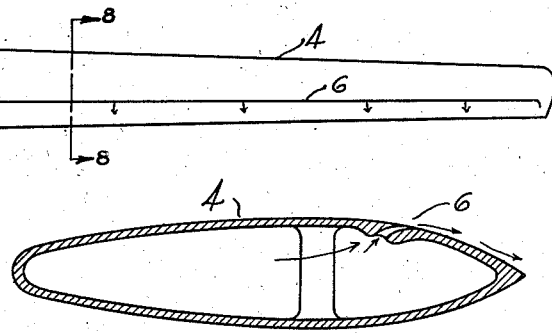
Fig. 8 is a section along line 8—8 in Fig. 7.

The discharge of the jets from the blade slots 6 provides a propulsive force which is the means of rotating the rotor. As shown in Fig. 8 the slot is directed rearwardly substantially tangentially of the blade surface. If desired duplicate slots 6 may be provided on both the upper and lower blade surfaces to develop a balanced forward thrust.

The blade section is selected to cooperate with the type of propulsive jet described and to work toward the objective of keeping the cross-sectional area of the jet small. A wing section which will provide a laminar flow thereon will give the least drag and therefore require the smallest jet to propel it.

Figure 7:
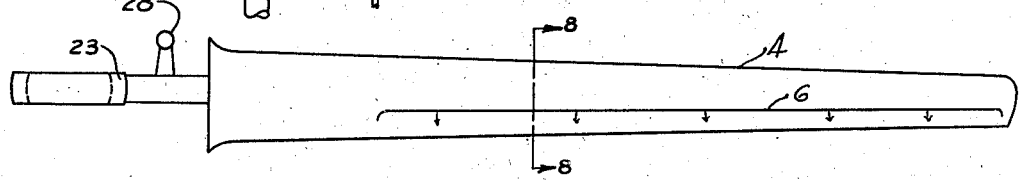
Fig. 7 is plan view of a blade.

Control of the pitch of the blades is effected by the pilot who can move the control rods 25 whose ends are slideably connected to the tiltable ring 26 to which the arm 27 is articulated. The other end of 27 is articulated to the arm 28 fixed to the blade as shown in Fig. 7 for instance.

Suitable control mechanism 29 is accessible to the pilot and is suitably connected to control rods 25.

In operation, rotation of engine 8 will cause induction through slots 9 of boundary layer air of very low total energy relative to the aircraft. That air is compressed in passing through the blower and delivered into the several blades from which it is emitted in jets having relatively small jet velocity above that of the blades themselves, thus developing high overall efficiency. Control of the speed of rotation of the blades is obtainable by throttling the engine, and the manoeuvering of the aircraft, and the control of the flapping position of the blades, are otherwise the same as heretofore.

Cross reference is made to applicant's copending application Serial No. 509,398 filed concurrently herewith and showing the application of the present invention to an aircraft of the fixed wing type. The said copending application is now abandoned.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. In combination in a direct lift aircraft, a fuselage having a nose portion subjected to the unaccelerated streamlined flow of the relative wind and having a surface rearwardly of said nose portion over which a laminar flow of boundary layer air develops, a wing supported on said fuselage for rotation about an upright axis to support the aircraft in flight, said wing having a spanwise passage and a discharge slot in its surface in communication with said passage, said passage being relatively narrow and within the limited thickness of the wing throughout the extent thereof, blower means in communication with said passage to introduce into said passage a flow of unheated relatively dense air for discharge of a jet outwardly through said slot at a relatively small increase of the jet velocity above that of said wing to develop an effective jet reaction to rotate said wing about said axis, means to supply said blower with air of low total initial energy relative to the aircraft including means defining a relatively narrow slot in said rearwardly located surface of said fuselage, said slot being located in a portion of said surface over which said laminar flow prevails, said slot having limited width of opening not exceeding about 1½% of the length of the unbroken surface ahead of the slot to induct primarily the boundary layer air while essentially excluding air of higher velocity, and means establishing communication between said fuselage slot and the inlet of said blower for supplying said low velocity boundary layer air to said blower for discharge through said relatively narrow passage as a low velocity jet of dense air having sufficient mass in its said unheated state to develop an effective propulsive thrust.

2. In combination in a direct lift aircraft, a fuselage having a nose portion subjected to the unaccelerated streamlined flow of the relative wind and having a surface rearwardly of said nose portion over which a laminar flow of boundary layer air develops, a wing supported on said fuselage for rotation about an upright axis to support the aircraft in flight, said wing having a spanwise passage and a discharge slot in its surface in communication with said passage, said passage being relatively narrow and within the limited thickness of the wing throughout the extent thereof, blower means in communication with said passage to introduce into said passage a flow of unheated relatively dense air for discharge of a jet outwardly through said slot at a relatively small increase of the jet velocity above that of said wing to develop an effective jet reaction to rotate said wing about said axis, means to supply said blower with air of low total initial energy relative to the aircraft including means defining a plurality of relatively narrow induction slots in spaced relation in said rearwardly located surface of the fuselage, at least one of said induction slots being located in a portion of said surface over which said laminar flow prevails, and another slot being located rearwardly thereof in predetermined spaced relation thereto such that laminar flow is maintained over said body surface between said slots, said slots each having limited width of opening not exceeding about 1½% of the length of the unbroken surface ahead of the slot to induct primarily the boundary layer air while essentially excluding air of higher velocity, and means establishing communication between said fuselage slots and the inlet of said blower for supplying said low velocity boundary layer air to said blower for discharge through said relatively narrow passage as a low velocity jet of dense air having sufficient mass in its said unheated state to develop an effective propulsive thrust.

EDWARD A. STALKER.

REFERENCES CITED

The following references are of record in the file of this patent:

UNITED STATES PATENTS

| Number | Name | Date |
|---|---|---|
| 1,913,644 | Stalker | June 13, 1933 |
| 2,084,464 | Stalker | June 22, 1937 |
| 2,092,077 | Knight et al. | Sept. 7, 1937 |
| 2,119,806 | Dornier | June 7, 1938 |

FOREIGN PATENTS

| Number | Country | Date |
|---|---|---|
| 512,064 | Great Britain | Aug. 29, 1939 |
| 687,481 | France | Apr. 28, 1930 |